United States Patent

McClamrock

[15] 3,689,989
[45] Sept. 12, 1972

[54] PROCESS OF ASSEMBLING SOLID ELECTROLYTIC CAPACITORS USING VIBRATION STEP WITH BOTH LOW AND HIGH FREQUENCY COMPONENTS

[72] Inventor: Grady L. McClamrock, Mocksville, N.C.

[73] Assignee: Western Electric Company, Incorporated, New York, N.Y.

[22] Filed: Oct. 2, 1970

[21] Appl. No.: 77,488

[52] U.S. Cl. .................................29/570, 29/203 J
[51] Int. Cl. .........................B01j 17/00, H01g 13/00
[58] Field of Search .........29/570, 589, 203 P, 203 S, 29/203 J, 500, 471, DIG. 46; 317/230; 219/9.5

[56] References Cited

UNITED STATES PATENTS

| | | | |
|---|---|---|---|
| 3,495,323 | 2/1970 | Fournier | 29/570 |
| 3,276,854 | 10/1966 | Felker et al. | 29/589 X |
| 2,455,136 | 11/1948 | Oburt | 219/9.5 |
| 3,005,257 | 10/1961 | Fox | 29/589 |
| 3,284,257 | 11/1966 | Soloff et al. | 156/73 |
| 3,474,523 | 10/1969 | Musso et al. | 29/473.5 |

Primary Examiner—John F. Campbell
Assistant Examiner—D. M. Heist
Attorney—W. M. Kain, R. P. Miller and W. L. Williamson

[57] ABSTRACT

A solder preform slug and a processed anode are placed into a can. A glass end seal and an outer solder preform O-ring are placed on a lead extending from the anode. The assembled components are heated to the melting temperature of the solder preforms. The can is vibrated by applying high frequency vibrations to a bar supporting the can. The bar has a natural low frequency of vibration such that both the high frequency vibrations and the low frequency vibrations are applied to the can. The low frequency vibrations settle the anode into the can and release gases which are produced from rosin. The high frequency components produce rotation of the can which aids in the sealing of the end seal by the solder preform O-rings.

12 Claims, 5 Drawing Figures

INVENTOR
G.L. McCLAMROCK
O. W. Marks
By
ATTORNEY

PROCESS OF ASSEMBLING SOLID ELECTROLYTIC CAPACITORS USING VIBRATION STEP WITH BOTH LOW AND HIGH FREQUENCY COMPONENTS

BACKGROUND OF THE INVENTION

1. Field of the Invention

A solid electrolytic capacitor, such as a tantalum capacitor, is formed by (1) sintering finely divided valve metal, such as tantalum, into a porous anode mounted on a lead, (2) anodizing the porous anode to form a dielectric oxide layer, such as tantalum pentoxide, (3) coating the anodized anode with a layer of manganese dioxide, (4) applying a coating of graphite, (5) applying a coating of finely divided silver, (6) dipping the coated anode into a solder bath, and (7) attaching the processed solder coated anode to a can with a lead extending therefrom. This invention is particularly concerned with the last step of attaching the processed anode to the can.

2. Prior Art

In the prior art, the processed anode along with a solder preform slug are placed in a can. Also, a glass end seal and an outer solder preform O-ring are placed over the lead extending from the processed anode. The solder preforms have a suitable rosin coating. The assembled components are then heated to the melting temperature of the solder preform to connect the processed anode to the can and to seal the end seal to the can and the lead. However, gases formed by the rosin or reactions therewith often times prevent the anode from settling into the bottom of the can and prevent the end seal from seating on the open end of the can. While it has generally been known that vibrations in the ultrasonic range can be used to weld or aid in the forming of a bond between two metals, the use of ultrasonic vibrations has been unsuccessful in overcoming the problems of settling the anode in the can or making a good seal on the end seal.

SUMMARY OF THE INVENTION

An object of the invention is a new and improved process for assembling processed capacitor anodes into cans.

Another object of the invention is the use of selected frequency vibrations to aid in the assembly of a processed anode in a can.

In accordance with these and other objects, a process for assembling a processed capacitor anode in a can utilizes the steps of placing a solder preform slug and the anode in the can; heating the anode, can and solder to a temperature above the melting point of the solder; and vibrating the can with a frequency having a low component between 100 and 1,000 cycles per second and a high component between 3,000 and 10,000 cycles per second.

DETAILED DESCRIPTION

Figure 1:
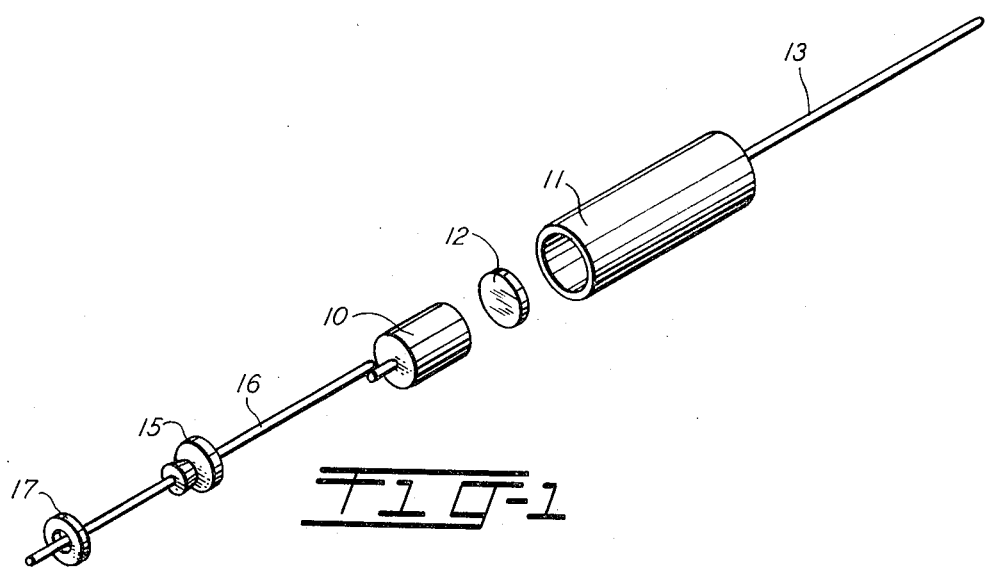
FIG. 1 is an assembly drawing of a dry electrolytic capacitor.

Referring to FIG. 1 there is shown a capacitor assembly wherein a processed anode 10 is assembled into a can 11 along with a solder preform slug 12. A glass end seal 15 is placed on the lead 16 extending from the processed anode 10. The end seal 15 is designed to fit in a groove formed in the upper inner edge of the can 11. An outer solder preform O-ring 17 is placed over the lead 16 on top of the end seal 15. The capacitor assembly is heated above the melting point of the solder and vibrations having both high frequency and low frequency components are applied to the can 11 to attach the processed anode 10 to the can and to seal the end seal 15 to the can 11. Subsequently, the capacitor assembly may be evacuated and filled with a special atmosphere, such as dry air or an inert gas. Then the end seal 15 is sealed to the lead 16 by an operator applying heat and solder to the lead 16 where it extends from the end seal 15. Alternately, an inner O-ring may be placed over the lead 16 prior to heating and vibrating the capacitor assembly such that the lead 16 is sealed in the end seal 15 at the same time the end seal 15 is sealed to the can 11.

Figure 2:
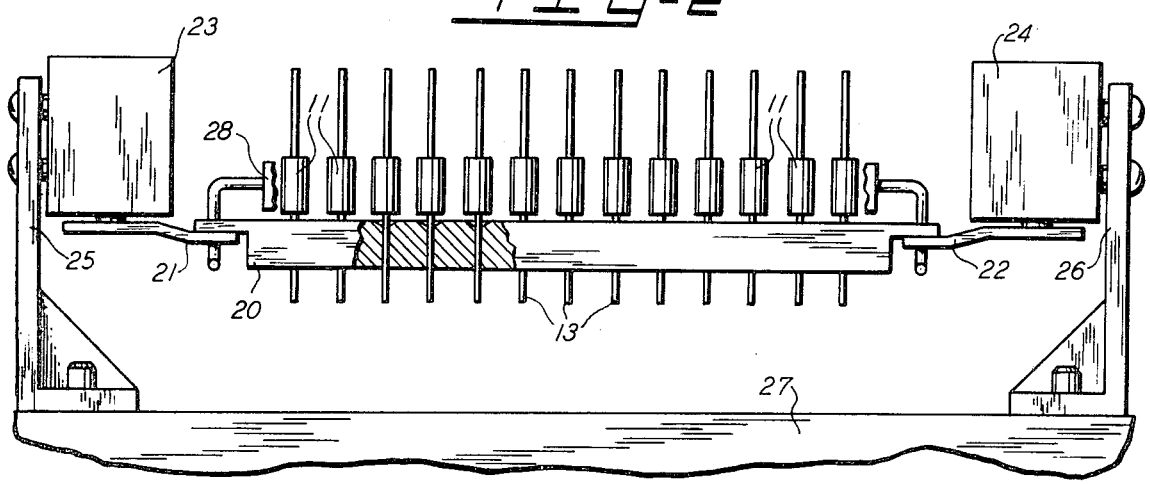
FIG. 2 shows a fixture for holding the capacitors while they are heated and vibrated.

Referring now to FIG. 2, there is shown an apparatus for heating and vibrating a plurality of assembled capacitors. A plurality of the cans 11—11 are placed on a bar 20 with welded leads 13—13 extending from the cans 11—11 through apertures in the bar 20. The bar 20 is supported at its two ends on respective arms 21 and 22 which are attached to respective electromagnetic vibrators 23 and 24. The electromagnetic vibrators 23 and 24 are supported by supports 25 and 26 mounted on a table top 27. An induction heating coil 28 suitably supported on the table top 27 surrounds the cans 11—11 to heat the assembled units to the melting temperature of the solder.

The bar 20 has a suitable mass and length to have a natural frequency generally within the range of 100 to 1,000 cycles per second. Preferably the natural frequency is from 200 to 400 cycles per second. The vibrators 23 and 24 are connected in parallel to a power generator (not shown) which excites them at a frequency which is generally in a range of from 3,000 to 10,000 cycles per second, and preferably in a range of 7,000 to 8,000 cycles per second. The higher frequency applied by the vibrators 23 and 24 to the bar 20 excites the bar into also producing vibrations of a low frequency which is the natural vibrating frequency of the bar. The low frequency vibrations of the bar 20 cause the anodes 10—10 to settle to the bottom of the cans 11—11 and forces the gases formed from the rosin reacting within the cans 11—11 to escape past the sides of the anodes and out the end seal. The high frequency vibrations produce a rotative motion of the cans 11—11 which aids the settling of the end seals 15 into the groove in the top of the can 11. Also, the rotative motion by centrifugal force causes the molten outer solder preform O-ring to flow outwardly into contact with the can 11 to insure an even solder bond around the upper edge of the can 11 to seal the can. Experimentation with different vibrators and different size and shapes of bars indicate that this rotative motion is a natural phenomenon or that electromagnetic vibrators arranged, as shown in FIG. 2, generally impart a rotative component of vibration to the bar 20. One vibrator used by the inventor is model no. V-2-A sold by Syntron of Homer City, Pennsylvania.

Figure 3:
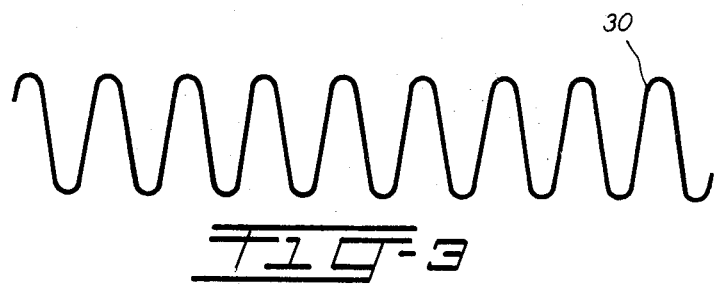
FIG. 3 shows a waveform of the vibrations applied to a carrier bar of the apparatus shown in FIG. 2.
Figure 4:
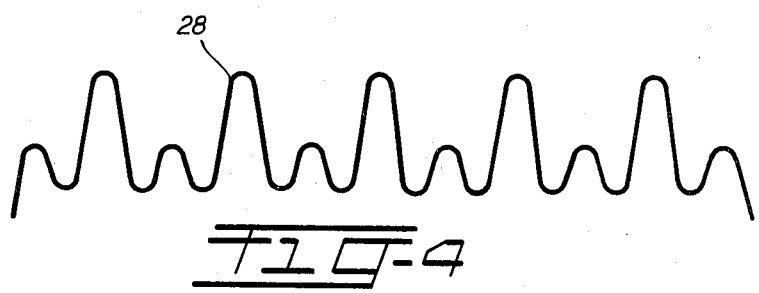
FIG. 4 shows a waveform of the vibrations on the ends of the bar.
Figure 5:
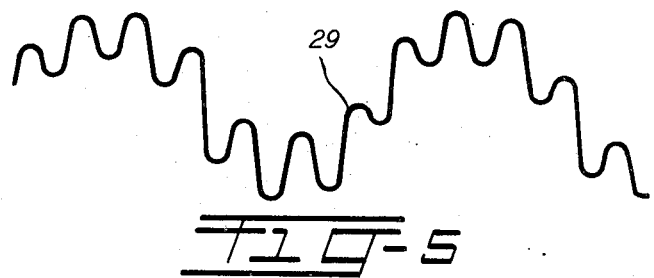
FIG. 5 shows a waveform of the vibrations applied by the carrier bar to the capacitor assembly.

Referring to FIG. 3 the waveform 30 shows the high frequency vibrations produced by the vibrators 23 and 24. The only measurable vibration produced by the vibrators 23 and 24 is the high frequency vibration. Referring to FIG. 4 the waveform 28 shows the vibrations of the ends of the carrier bar 20. Referring to FIG. 5 the waveform 29 shows the vibrations applied to the cans 11. The vibrations applied to the cans 11 have both the high frequency component and the low frequency component. The solder used may be selected from many acceptable solders, such as tin-lead solders or tin-antimony solders.

It is to be understood that the above-described embodiment of the invention is simply illustrative of the invention and that many embodiments can be devised without departing from the scope and spirit of the invention.

What is claimed is:

1. A process of assembling a capacitor anode in a can comprising:
    placing a solder preform and the anode in the can;
    heating the anode, can and solder preform to a temperature above the melting point of the solder preform; and
    vibrating the can with a vibration having a low frequency component between 100 and 1,000 cycles per second and a high frequency component between 3,000 and 10,000 cycles per second.

2. A process as defined in claim 1 wherein the frequency of vibration of the can has a low component between 200 and 400 cycles per second and a high component between 7,000 and 8,000 cycles per second.

3. A process as defined in claim 1 wherein the can is rotated by the vibrations.

4. A process as defined in claim 2 wherein the can is rotated by vibrations.

5. A process as defined in claim 3 wherein an end seal and a solder O-ring are placed over a lead extending from the anode prior to heating and vibrating.

6. A process as defined in claim 4 wherein an end seal and a solder O-ring are placed over a lead extending from the anode prior to heating and vibrating.

7. A process of assembling a plurality of capacitor anodes into a plurality of cans, one can for each anode comprising:
    placing the plurality of cans into a plurality of recesses in a holding member which has a natural frequency of vibration between 100 and 1,000 cycles per second;
    placing a plurality of solder preforms into the plurality of cans, one preform in each can;
    placing the plurality of anodes into the plurality of cans, one anode in each can; and
    exciting the holding member by a vibration having a frequency component between 3,000 and 10,000 cycles per second to vibrate the cans with both a low frequency component between 100 and 1,000 cycles per second and a high frequency component between 3,000 and 10,000 cycles per second.

8. A process as defined in claim 7 wherein the holding member has a natural frequency of vibration between 200 and 400 cycles per second and the holding member is excited by a frequency between 7,000 and 8,000 cycles per second.

9. A process as defined in claim 7 wherein the cans are rotated.

10. A process as defined in claim 8 wherein the cans are rotated.

11. A process as defined in claim 9 wherein an end seal and a solder O-ring are placed over a lead extending from each of the plurality of anodes prior to heating and vibrating.

12. A process as defined in claim 10 wherein an end seal and a solder O-ring are placed over a lead extending from each of the plurality of anodes prior to heating and vibrating.

* * * * *